C. W. HUNT.
Sheave for Wire Rope.

No. 213,753.          Patented April 1, 1879.

Witnesses.
H. H. Bush
C. F. Heath

Inventor.
Charles W. Hunt

UNITED STATES PATENT OFFICE.

CHARLES W. HUNT, OF WEST NEW BRIGHTON, NEW YORK.

IMPROVEMENT IN SHEAVES FOR WIRE-ROPE.

Specification forming part of Letters Patent No. 213,753, dated April 1, 1879; application filed December 14, 1878.

*To all whom it may concern:*

Figure 1:
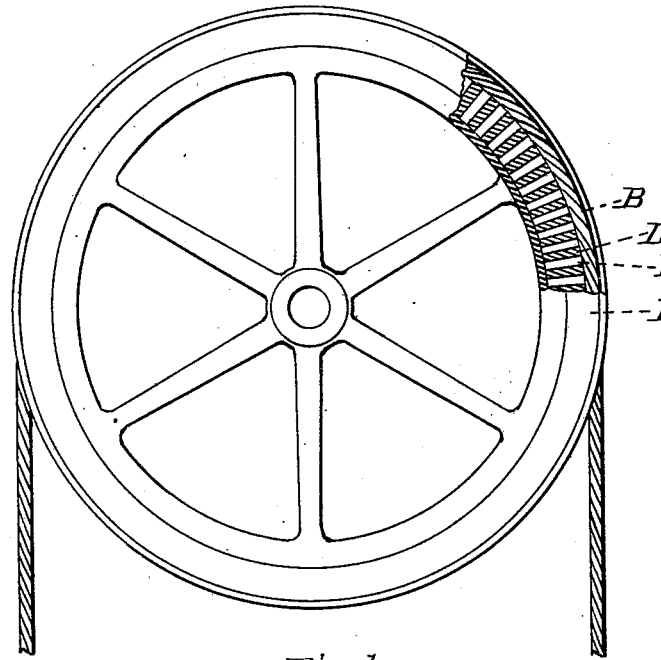
Figure 2:
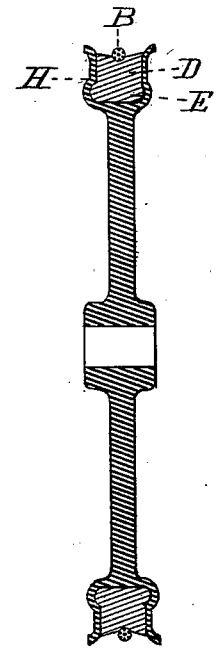

Be it known that I, CHARLES W. HUNT, of West New Brighton, Richmond county, and State of New York, have invented new and useful Improvements in Sheaves for Wire-Rope, of which the following is a specification:

In the drawings accompanying this specification, Figure 1 is a side elevation of a sheave, partly in section. Fig. 2 is a cross-section of the sheave, showing the lining D and E for the rope to run on.

It is the object of this invention to reduce the wear of wire-rope by lining the sheave over which it runs with the substances hereinafter named.

In Fig. 1 is shown a deep score in the sheave H, filled with pieces D and E, having the bottom wider than the top, to prevent the pieces from flying out by centrifugal force when the pulley is revolved. I use for filling this core pieces of rawhide or untanned skins of animals cut in pieces to fit the score, in combination with like pieces of leather, rubber, or substances of a different nature from the rawhide, and put in as shown in Fig. 1, the rope B running on the outer edges of them, thus preventing the rope from touching the sheave H and wearing either that or the rope. This rawhide is at once tough and elastic enough to prevent all cutting of the rope, and more durable than any other material heretofore used.

When exposed to moisture, which softens rawhide, I combine with it sections of leather or rubber, which is cut in sections the same as the rawhide. More or less of these pieces can be used, as may be best for the particular service the pulley is to be put to. Thus, in a situation where there is occasional moisture I prefer to use alternate sections of rawhide and leather. This combination is not injuriously affected by oil, and when exposed to moisture the leather will stand the strain until the pulley is dry again, when the rawhide resumes its hardness.

For the transmission of power the combination of rawhide and pieces of rubber possesses some advantages by having more friction on the rope, and driving the rope with more force without slipping.

In the practical application of my invention the wheel H is of cast-iron, with a score, cast with the bottom of the score wider, or with projections that prevent the rope from falling out. This score is then filled by placing pieces of the lining material in the score on edge, and as close together as possible. This lining when worn can be renewed easily, and the wheel H is then the same as when new.

What I claim as my invention is—

The sheave H for wire-rope having the score filled with pieces of rawhide, in combination with pieces of leather, rubber, or other material, substantially as and for the purpose specified.

CHARLES W. HUNT.

Witnesses:
J. W. ANDREAS,
JOS. VAN NOSTRAND.